Patented Dec. 19, 1933

1,940,618

UNITED STATES PATENT OFFICE 1,940,618

METHOD OF PURIFYING MAGNESIUM

Edwin O. Barstow and John A. Gann, Midland, Mich., assignors to The Dow Chemical Company, Midland, Mich., a corporation of Michigan No Drawing. Application August 3, 1932
Serial No. 627,364

14 Claims. (Cl. 75—17)

The present invention is concerned with methods of melting and purifying magnesium and alloys thereof, and has particular regard to methods wherein a bath of a fluid flux is employed.

It has been common practice to employ as flux for purifying magnesium various salt mixtures which have suitable melting points and are not actively decomposed by magnesium at the temperatures required for the operation. Of such salt fluxes which have had any considerable use, the majority contain magnesium chloride as a principal component. There are certain disadvantages connected with the use of fluxes containing magnesium chloride, however. The anhydrous chloride is difficult and costly to prepare, and on account of its extreme avidity for water a flux containing the same must be carefully preserved from contact with air in order to avoid absorption of moisture, which would render it unsuitable for use. During use the flux takes up magnesium oxide and other non-metallic impurities from the metal, and also decomposes to an appreciable extent in contact with the air to form the oxide, so that it quickly becomes contaminated due to the accumulation of insoluble solid matter therein. The used material cannot be purified successfully in a fit condition for reuse, hence must be discarded and replaced with fresh material. There is also a material loss of flux caused by volatilization of magnesium chloride from the molten salt bath. The cost of flux has been a considerable item of expense in connection with the melting and purifying of magnesium. It has consequently become desirable to find a suitable flux which dispenses with the use of anhydrous magnesium chloride and which can be used with equally good or better results.

We have found that mixtures of calcium chloride and sodium chloride may be substituted advantageously for the fluxes containing magnesium chloride which have been used heretofore. Such a flux may be prepared simply by mixing ordinary commercial calcium chloride, containing from about 75 to 80 per cent $CaCl_2$, with the requisite amount of sodium chloride, and then air-drying or fusing the mixture, or by drying the salts separately and then mixing. No tedious and costly manipulation is involved, such as is required to prevent decomposition of magnesium chloride when the latter is dehydrated. The composition of our new flux, calculated on the anhydrous basis, may vary between about 85 to 50 parts by weight of $CaCl_2$ and 15 to 50 parts of NaCl. For greatest fluidity of the molten flux, a narrower range of composition is preferable, e. g. between about 75 and 60 parts of $CaCl_2$ and about 25 to 40 parts of NaCl.

The office of a flux of the present character in a method of melting and purifying magnesium is to take up and segregate nonmetallic impurities from the metal. A molten calcium chloride-sodium chloride flux having a composition within the limits stated, in common with the magnesium chloride fluxes heretofore employed, is heavier than the usual magnesium alloys, hence the molten metal normally floats on the bath of molten flux. In the case of magnesium chloride fluxes, the flux has the ability to form a persistent film which covers more or less completely the surface of a body of molten magnesium floating thereon. The presence of this film when using a magnesium chloride flux protects the exposed surface of the molten metal from contact with the atmosphere, so that the melting and purification of magnesium can be carried out therewith in open pots without excessive oxidation of the metal. On the other hand, the surface film of flux is a disadvantage, because it is difficult to separate the molten metal from the flux when the former is cast, the flux tending to follow the metal and cause flux inclusions in the casting. However, our calcium chloride-sodium chloride flux is distinguished from a magnesium chloride flux in that the molten flux has little, if any, tendency to form a film over the body of molten metal floating thereon. Consequently the flux has but a slight effect for protecting the molten metal from contact with the atmosphere, its action being limited largely to one of purification. We have found, however, that we can offset this apparent disadvantage by carrying out the treatment of the metal with the flux in a closed melting pot in which is maintained a protective atmosphere which inhibits or prevents oxidation of the molten metal.

The absence of a film forming capacity of our new flux, on the other hand, affords a conspicuous advantage in that the flux is more readily separated from the molten metal when the latter is ladled or poured from the melting pot. The flux does not have as great a tendency to "follow" the metal, and the danger of producing flux inclusions in the castings is greatly reduced.

We have also found that a further reduction in film forming capacity of the calcium chloride-sodium chloride flux may be produced by adding a relatively small amount of a fluoride of an alkali or alkaline earth metal, e. g. calcium fluoride or sodium fluoride. The amount added may vary from 1 to 20 per cent of the weight of the flux about 5 per cent of calcium fluoride being suitable for general use.

In the case of melting an alloy having a materially higher specific gravity than that of pure magnesium, it may be advantageous to incorporate a small amount of barium chloride in the flux to increase the specific gravity thereof. The amount of barium chloride added may vary from about 2 to 20 per cent by weight of the flux, for usual purposes about 5 per cent being sufficient.

As an example of the preparation of our new flux, approximately 75 parts of commercial calcium chloride (75-80 per cent $CaCl_2$) and 25 parts of sodium chloride are melted together in a suitable melting pot and 5 parts of calcium fluoride are added thereto. At the temperature required for fusion of the mixture the water content of the commercial calcium chloride is driven off without any material decomposition of the salt. If it is desired to increase the density of the flux, about 5 parts of hydrated barium chloride ($BaCl_2.2H_2O$) may be added, the water content of which is driven off without decomposition. The quantities specified in the foregoing example are not to be taken as a limitation upon the invention, inasmuch as a wide variation in the proportions of components is permissible without exceeding the scope of the invention.

The procedure for using our improved flux comprises, in general, melting up a quantity of the flux in a suitable melting pot provided with a cover and means for introducing a protective gas, or material capable of generating such gas, and charging in a quantity of magnesium or alloy thereof to be melted and purified. The relative proportions of flux and metal are preferably such that when melted the metal floats freely on the molten bath of flux. The cover is then closed down, and as the melting of the metal proceeds a protective gas is led into or generated within the closed vessel. After the metal is melted, it may be stirred by a suitable tool inserted through an opening in the cover. The stirring mixes the molten metal and flux together, whereby non-metallic impurities in the metal are taken up by the flux. The presence of the protective atmosphere within the melting pot inhibits oxidation or burning of the metal, and the contamination which would be caused thereby. After the stirring operation, the contents of the pot are allowed to stand while separation of the purified metal and flux takes place. The metal may then be transferred to a mold, as by ladling or pouring.

As a protective gas or vapor we may employ sulphur, by introducing vapors thereof from an external source, or by adding the solid substance which is vaporized in situ in the pot. Another type of protective atmosphere consist of nitrogen containing a relatively small amount of carbon bisulphide, as more particularly described in the prior application of E. O. Barstow, Serial No. 600,381, filed March 21, 1932. For generating a protective atmosphere within the melting pot we may add a volatilizable compound of fluorine, such as an ammonium-fluorine compound, e. g. according to the copending application of H. A. Reimers, Serial No. 617,876, filed June 17, 1932. Examples of such ammonium-fluorine compounds are ammonium fluoride and bifluoride, ammonium borofluoride, ammonium silicofluoride, etc. A very small amount of such solid ammonium-fluorine compounds, when added to the closed melting pot and volatilized therein, will suffice to produce a protective atmosphere, even in the presence of air or free oxygen. We may also employ various gaseous fluorine compounds, such as the fluorides of boron, silicon, sulphur or phosphorus, by introducing the same into the closed melting pot.

The metal melted and refined according to the foregoing procedure employing our improved flux in conjunction with a protective atmosphere within a closed melting vessel, may be poured or ladled from the melting vessel and cast into ingots or the like which are remarkably free from salt inclusions. The manipulation for separating flux and metal is simpler than in the case where a magnesium chloride flux is used, and the certainty of avoiding salt inclusions in the castings is much greater. Naturally the hereinbefore described method may be employed for melting and casting magnesium and alloys thereof, irrespective of whether a simultaneous purification of the metal is required. If it is desired simply to melt the metal for the purpose of making castings thereof, the procedure will be modified to the extent that less agitation of the molten metal with the flux may be resorted to, or such agitation may be omitted entirely.

Another advantage is that a smaller quantity of a flux of the type herein described suffices to purify a given amount of magnesium than in the case of a magnesium chloride flux. This is due to the fact that a calcium chloride-sodium chloride flux may be melted and used repeatedly without undergoing material decomposition, whereas a magnesium chloride flux suffers serious decomposition accompanied by formation of magnesium oxide or other insoluble basic magnesium compounds which normally accumulate in the flux more rapidly than impurities taken up from the metal, reducing its fluidity and effectiveness after relatively short period of use to the point where it must be discarded. Such deterioration and loss of flux due to decomposition is substantially avoided by using a calcium chloride-sodium chloride flux such as those hereinbefore described.

In the claims the term "magnesium" is intended to include alloys in which magnesium is the principal constituent.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of purifying magnesium which comprises agitating the molten metal in a closed vessel with a fluid flux of calcium chloride and sodium chloride in the presence of a protective atmosphere capable of inhibiting oxidation of the metal.

2. The method of purifying magnesium which comprises agitating the molten metal in a closed vessel with a fluid flux of calcium chloride and sodium chloride to which has been added a relatively small amount of a fluoride of an alkali or alkaline earth metal, in the presence of a protective atmosphere capable of inhibiting oxidation of the metal.

3. The method of purifying magnesium which comprises agitating the molten metal in a closed vessel with a fluid flux of calcium chloride and sodium chloride to which has been added a relatively small amount of calcium fluoride, in the presence of a protective atmosphere capable of inhibiting oxidation of the metal.

4. The method of purifying magnesium which comprises agitating the molten metal in a closed vessel with a fluid flux of calcium chloride and sodium chloride to which has been added a relatively small amount of calcium fluoride and barium chloride, in the presence of a protective atmosphere capable of inhibiting oxidation of the metal.

5. The method of purifying magnesium which comprises agitating the molten metal in a closed vessel with a flux composed of calcium chloride and sodium chloride in a ratio by weight of $CaCl_2$ to NaCl of between $\frac{50}{50}$ and $\frac{85}{15}$, in the presence of a protective atmosphere capable of inhibiting oxidation of the metal.

6. The method of purifying magnesium which comprises agitating the molten metal in a closed vessel with a flux composed of calcium chloride and sodium chloride in a ratio by weight of $CaCl_2$ to NaCl of between $\frac{50}{50}$ and $\frac{85}{15}$ and a relatively small amount of an alkali or alkaline earth metal fluoride, in the presence of a protective atmosphere capable of inhibiting oxidation of the metal.

7. The method of purifying magnesium which comprises agitating the molten metal in a closed vessel with a flux composed of calcium chloride and sodium chloride in a ratio by weight of $CaCl_2$ to NaCl of between $\frac{50}{50}$ and $\frac{85}{15}$ and a relatively small amount of calcium fluoride and barium chloride, in the presence of a protective atmosphere capable of inhibiting oxidation of the metal.

8. The method of purifying magnesium which comprises melting the metal in a closed vessel with a quantity of a fluid calcium chloride-sodium chloride flux in the presence of a protective atmosphere to inhibit oxidation of the metal, stirring the molten metal and flux together to remove mechanical impurities from the metal, allowing the metal and flux to separate and transferring the metal to a mold.

9. The method of purifying magnesium which comprises melting the metal in a closed vessel with a body of a fluid flux composed of a mixture of calcium chloride and sodium chloride to which has been added a relatively small amount of calcium fluoride, in the presence of a protective atmosphere capable of inhibiting oxidation of the metal, stirring the molten metal and flux together to remove mechanical impurities from the metal, allowing the purified metal to separate from the flux and transferring the separated metal to a mold.

10. The method of purifying magnesium which comprises melting the metal in a closed vessel with a body of a fluid flux composed of a mixture of calcium chloride and sodium chloride to which has been added a relatively small amount of calcium fluoride and barium chloride, in the presence of a protective atmosphere capable of inhibiting oxidation of the metal, stirring the molten metal and flux together to remove mechanical impurities from the metal, allowing the purified metal to separate from the flux and transferring the separated metal to a mold.

11. In a method of casting magnesium, the steps which consist in melting the metal in a closed vessel with a fluid flux of calcium chloride and sodium chloride in the presence of a protective atmosphere capable of inhibiting oxidation of the metal and transferring the molten metal to a mold.

12. In a method of casting magnesium, the steps which consist in melting the metal in a closed vessel with a fluid flux of calcium chloride and sodium chloride to which has been added a relatively small amount of a fluoride of an alkali or alkaline earth metal, in the presence of a protective atmosphere capable of inhibiting oxidation of the metal and transferring the molten metal to a mold.

13. In a method of casting magnesium, the steps which consist in melting the metal in a closed vessel with a fluid flux of calcium chloride and sodium chloride to which has been added a relatively small amount of calcium fluoride, in the presence of a protective atmosphere capable of inhibiting oxidation of the metal and transferring the molten metal to a mold.

14. In a method of casting magnesium, the steps which consist in melting the metal in a closed vessel with a fluid flux of calcium chloride and sodium chloride to which has been added a relatively small amount of calcium fluoride and barium chloride, in the presence of a protective atmosphere capable of inhibiting oxidation of the metal and transferring the molten metal to a mold.

EDWIN O. BARSTOW.
JOHN A. GANN.